(12) United States Patent
Glynn

(10) Patent No.: US 6,196,693 B1
(45) Date of Patent: Mar. 6, 2001

(54) INTERNALLY LIGHTED GLOBE

(76) Inventor: Simon Glynn, Ridge Point, St. Mary's Hill, Sunninghill, Berkshire SL5 9AS (GB)

( * ) Notice: Subject to any disclaimer, the term of this patent is extended or adjusted under 35 U.S.C. 154(b) by 0 days.

(21) Appl. No.: 09/360,408

(22) Filed: Jul. 23, 1999

(51) Int. Cl.$^7$ ................................................ F21W 131/00
(52) U.S. Cl. ........................... 362/35; 362/809; 434/143; 434/145
(58) Field of Search .................... 362/35, 809; 434/131, 434/136, 143, 145

(56) References Cited

U.S. PATENT DOCUMENTS

| D. 387,805 | * | 12/1997 | Hsu ........................................ D19/61 |
| 2,020,284 | * | 11/1935 | Beck . | |
| 3,049,863 | * | 8/1962 | Ranney .................................. 362/809 |
| 3,305,946 | * | 2/1967 | Du Gardin . | |
| 3,348,321 | * | 10/1967 | Cunningham ......................... 362/809 |
| 4,761,138 | * | 8/1988 | Niesyn .................................. 434/134 |
| 5,545,041 | * | 8/1996 | Tsuzuki ................................. 434/136 |
| 6,027,343 | * | 2/2000 | Ho ........................................ 434/131 |

FOREIGN PATENT DOCUMENTS

0050589 * 3/1991 (JP) ..................................... 362/809

* cited by examiner

Primary Examiner—Laura K. Tso

(57) ABSTRACT

A internally lighted globe for showing the world as illuminated by the sun at the current time. The internally lighted globe includes a base with an arm coupled thereto. A sphere has indicia representing the surface of the earth and an axis. The sphere is rotatably coupled to the arm of the base along the axis of the sphere. The sphere is translucent so that light shining inside of the sphere illuminates the material of the sphere. A light means is rotatably positioned in the sphere for emitting light on a portion of the sphere corresponding to a portion of the earth illuminated by sunlight at a given time. The sphere completes one 360 degree revolution in 24 hours for simulating rotation of the earth about its axis.

10 Claims, 3 Drawing Sheets

INTERNALLY LIGHTED GLOBE

BACKGROUND OF THE INVENTION

1. Field of the Invention

The present invention relates to globes and more particularly pertains to a new internally lighted globe for showing the world as illuminated by the sun at the current time.

2. Description of the Prior Art

The use of globes is known in the prior art. More specifically, globes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,545,041; U.S. Pat. No. 4,761,138; U.S. Pat. No. 3,305,946; U.S. Pat. No. 2,490,185; U.S. Pat. No. 2,020,284; and U.S. Pat. No. Des. 387,805.

While these devices fulfill their respective, particular objectives and requirements, the aforementioned patents do not disclose a new internally lighted globe. The inventive device includes a base with an arm coupled thereto. A sphere has indicia representing the surface of the earth and an axis. The sphere is rotatably coupled to the arm of the base along the axis of the sphere. The sphere is translucent so that light shining inside of the sphere illuminates the material of the sphere. A light means is rotatably positioned in the sphere for emitting light on a portion of the sphere corresponding to a portion of the earth illuminated by sunlight at a given time. The sphere completes one 360 degree revolution in 24 hours for simulating rotation of the earth about its axis.

In these respects, the internally lighted globe according to the present invention substantially departs from the conventional concepts and designs of the prior art, and in so doing provides an apparatus primarily developed for the purpose of showing the world as illuminated by the sun at the current time.

SUMMARY OF THE INVENTION

In view of the foregoing disadvantages inherent in the known types of globes now present in the prior art, the present invention provides a new internally lighted globe construction wherein the same can be utilized for showing the world as illuminated by the sun at the current time.

The general purpose of the present invention, which will be described subsequently in greater detail, is to provide a new internally lighted globe apparatus and method which has many of the advantages of the globes mentioned heretofore and many novel features that result in a new internally lighted globe which is not anticipated, rendered obvious, suggested, or even implied by any of the prior art globes, either alone or in any combination thereof.

To attain this, the present invention generally comprises a base with an arm coupled thereto. A sphere has indicia representing the surface of the earth and an axis. The sphere is rotatably coupled to the arm of the base along the axis of the sphere. The sphere is translucent so that light shining inside of the sphere illuminates the material of the sphere. A light means is rotatably positioned in the sphere for emitting light on a portion of the sphere corresponding to a portion of the earth illuminated by sunlight at a given time. The sphere completes one 360 degree revolution in 24 hours for simulating rotation of the earth about its axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new internally lighted globe apparatus and method which has many of the advantages of the globes mentioned heretofore and many novel features that result in a new internally lighted globe which is not anticipated, rendered obvious, suggested, or even implied by any of the prior art globes, either alone or in any combination thereof.

It is another object of the present invention to provide a new internally lighted globe which may be easily and efficiently manufactured and marketed.

It is a further object of the present invention to provide a new internally lighted globe which is of a durable and reliable construction.

An even further object of the present invention is to provide a new internally lighted globe which is susceptible of a low cost of manufacture with regard to both materials and labor, and which accordingly is then susceptible of low prices of sale to the consuming public, thereby making such internally lighted globe economically available to the buying public.

Still yet another object of the present invention is to provide a new internally lighted globe which provides in the apparatuses and methods of the prior art some of the advantages thereof, while simultaneously overcoming some of the disadvantages normally associated therewith.

Still another object of the present invention is to provide a new internally lighted globe for showing the world as illuminated by the sun at the current time.

Yet another object of the present invention is to provide a new internally lighted globe which includes a base with an arm coupled thereto. A sphere has indicia representing the surface of the earth and an axis. The sphere is rotatably coupled to the arm of the base along the axis of the sphere. The sphere is translucent so that light shining inside of the sphere illuminates the material of the sphere. A light means is rotatably positioned in the sphere for emitting light on a portion of the sphere corresponding to a portion of the earth illuminated by sunlight at a given time. The sphere completes one 360 degree revolution in 24 hours for simulating rotation of the earth about its axis.

Still yet another object of the present invention is to provide a new internally lighted globe that is immediately easy to read for anywhere in the world.

Even still another object of the present invention is to provide a new internally lighted globe that is base on how the earth actually rotates.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
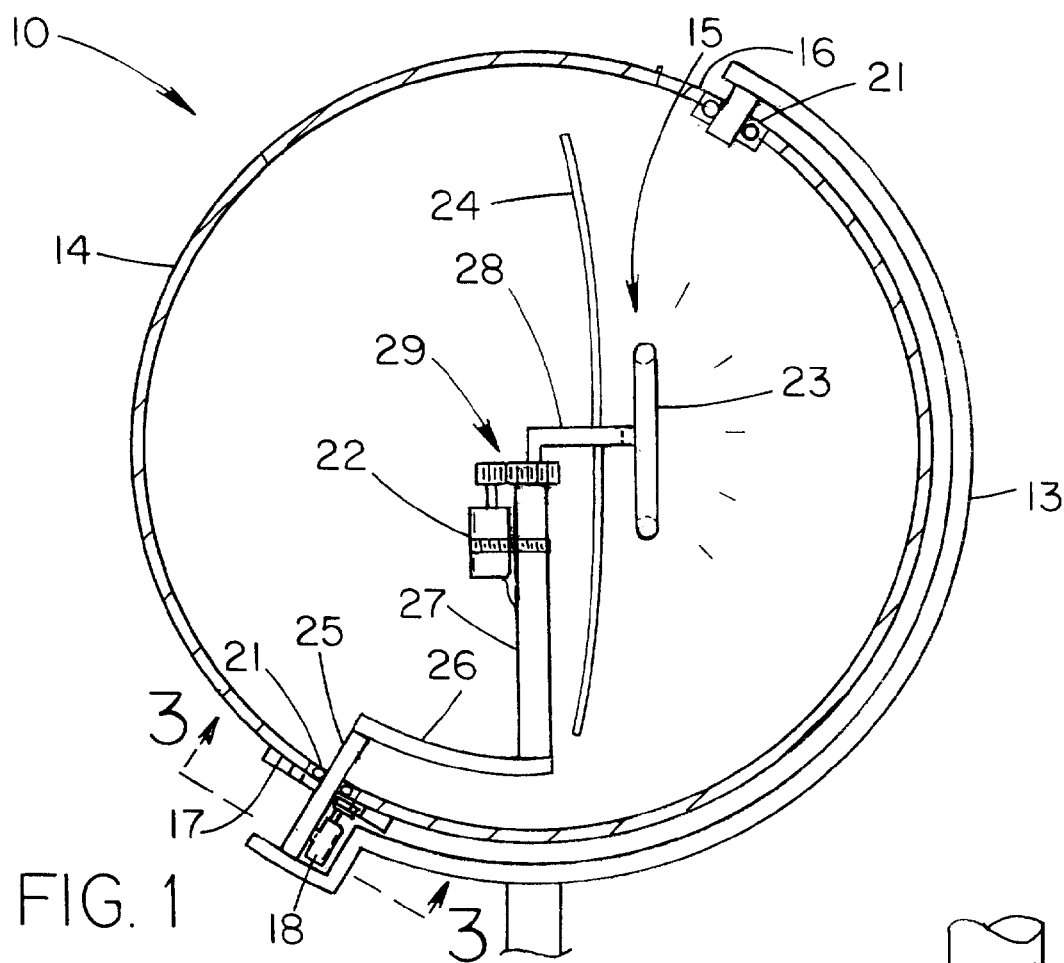
FIG. 1 is a schematic cross sectional view of a new internally lighted globe according to the present invention.

With reference now to the drawings, and in particular to FIGS. 1 through 5 thereof, a new internally lighted globe embodying the principles and concepts of the present invention and generally designated by the reference numeral 10 will be described.

As best illustrated in FIGS. 1 through 5, the internally lighted globe 10 generally comprises a base 12 with an arm 13 coupled thereto. A sphere 14 has indicia representing the surface of the earth and an axis. The sphere is rotatably coupled to the arm of the base along the axis of the sphere. The sphere is translucent so that light shining inside of the sphere illuminates the material of the sphere. A light means 15 is rotatably positioned in the sphere for emitting light on a portion of the sphere corresponding to a portion of the earth illuminated by sunlight at a given time. The sphere completes one 360 degree revolution in 24 hours for simulating rotation of the earth about its axis.

Preferably, the arm of the base is generally C-shaped so that the sphere can be rotatably coupled to free ends of the arm of the base along the axis of the sphere at north and south poles 16,17 thereof coinciding with the north and south poles of the earth.

Also preferably, the light means completes one 360 degree revolution in 365¼ days for simulating orbit of the earth about the sun.

Ideally, the axis of the sphere is angled at about 23.5 degrees from the vertical for representing the tilt of the axis of the earth relative to the orbit path of the earth around the sun.

Preferably, a first motor 18 rotates the sphere. The first motor is preferably positioned towards the south pole of the sphere. A toothed ring 19 extends around the south pole and is engaged by a gear wheel 20 of the first motor. See FIGS. 1 and 3. Ideally, the poles of the sphere have bearings 21 that engage the ends of the arm of the base to reduce frictional resistance.

Also preferably, a second motor 22 rotates the light means. The first and second motors could rotate slowly or could be step motors, turning a portion of a rotation at predetermined intervals.

Preferably, the light means comprises a bulb 23 and a generally circular shading plate 24 dimensioned for blocking light emitted by the bulb such that the shading plate shades about one-half of the sphere shaded from light emitted from the bulb. The lighted portion of the sphere represents the portion of the earth on which the sun is currently shining. The shaded portion of the sphere represents the portion of the earth in the dark. Ideally, the bulb and shading plate rotate about a center point of the sphere along a horizontal plane.

As shown in FIG. 1, a support shaft 25 of the lower end of the base arm extends into the sphere through the south pole. A dogleg 26 inwardly extends from the support arm. A center shaft 27 extends vertically upward from the dogleg towards the center of the sphere. A support arm 28 is rotationally coupled to the center shaft and a bearing may be positioned between them to reduce friction. The bulb and shading plate are coupled to the support arm. The second motor rotates the support arm by means of a gearing assembly 29.

Figure 2:
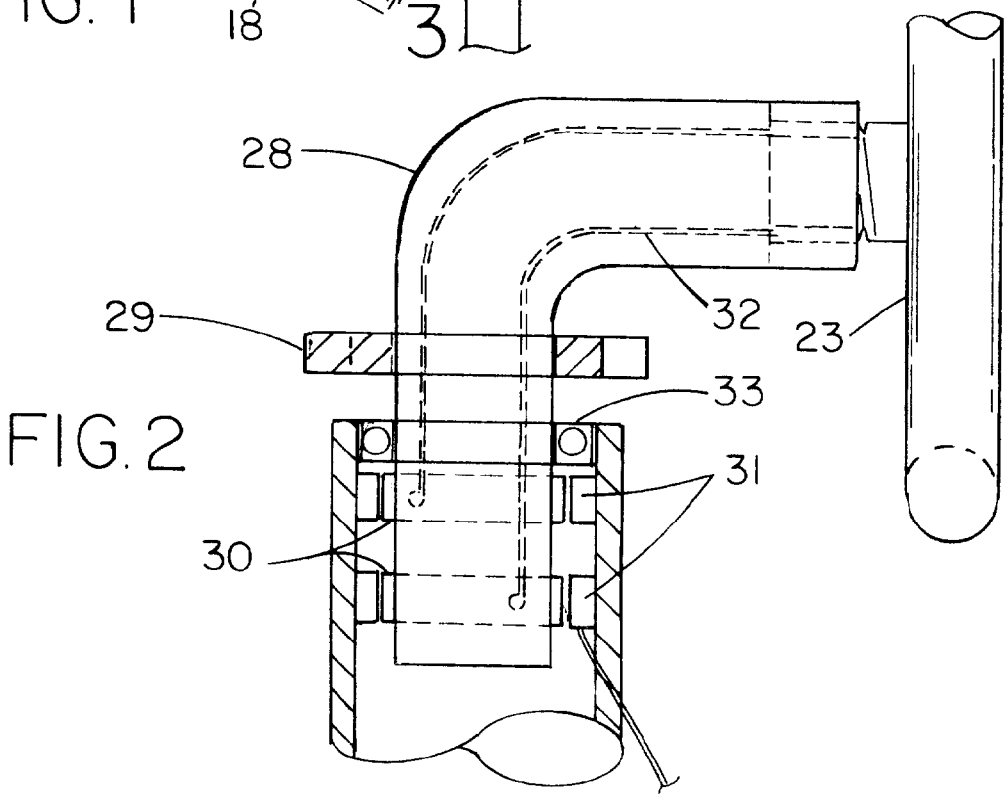
FIG. 2 is a schematic cross sectional view of a contact means present invention for transmitting electricity to the rotating light.
Figure 3:
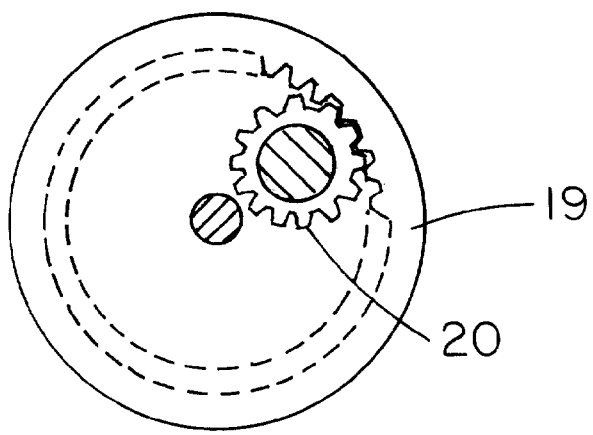
FIG. 3 is a schematic cross sectional view of the present invention taken from line 3—3 of FIG. 1.
Figure 4:
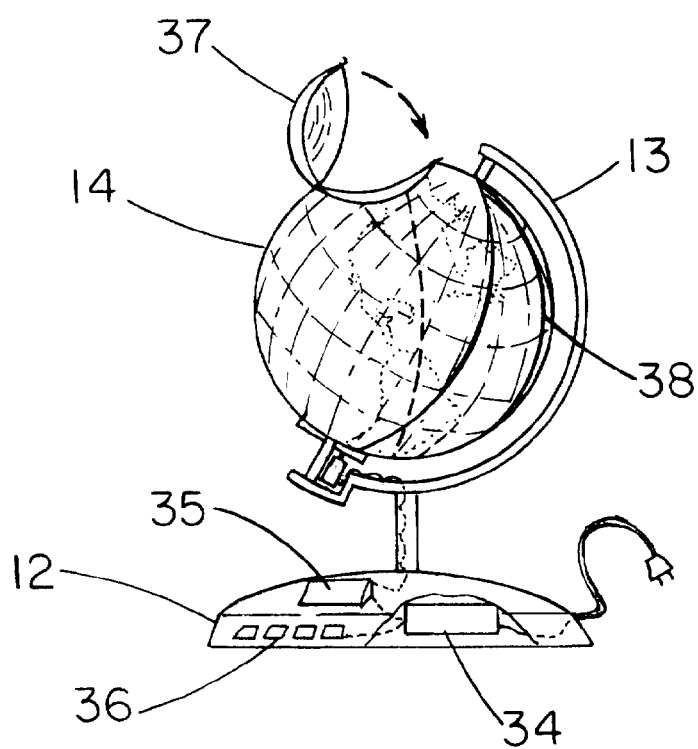
FIG. 4 is a schematic side view of the present invention.
Figure 5:
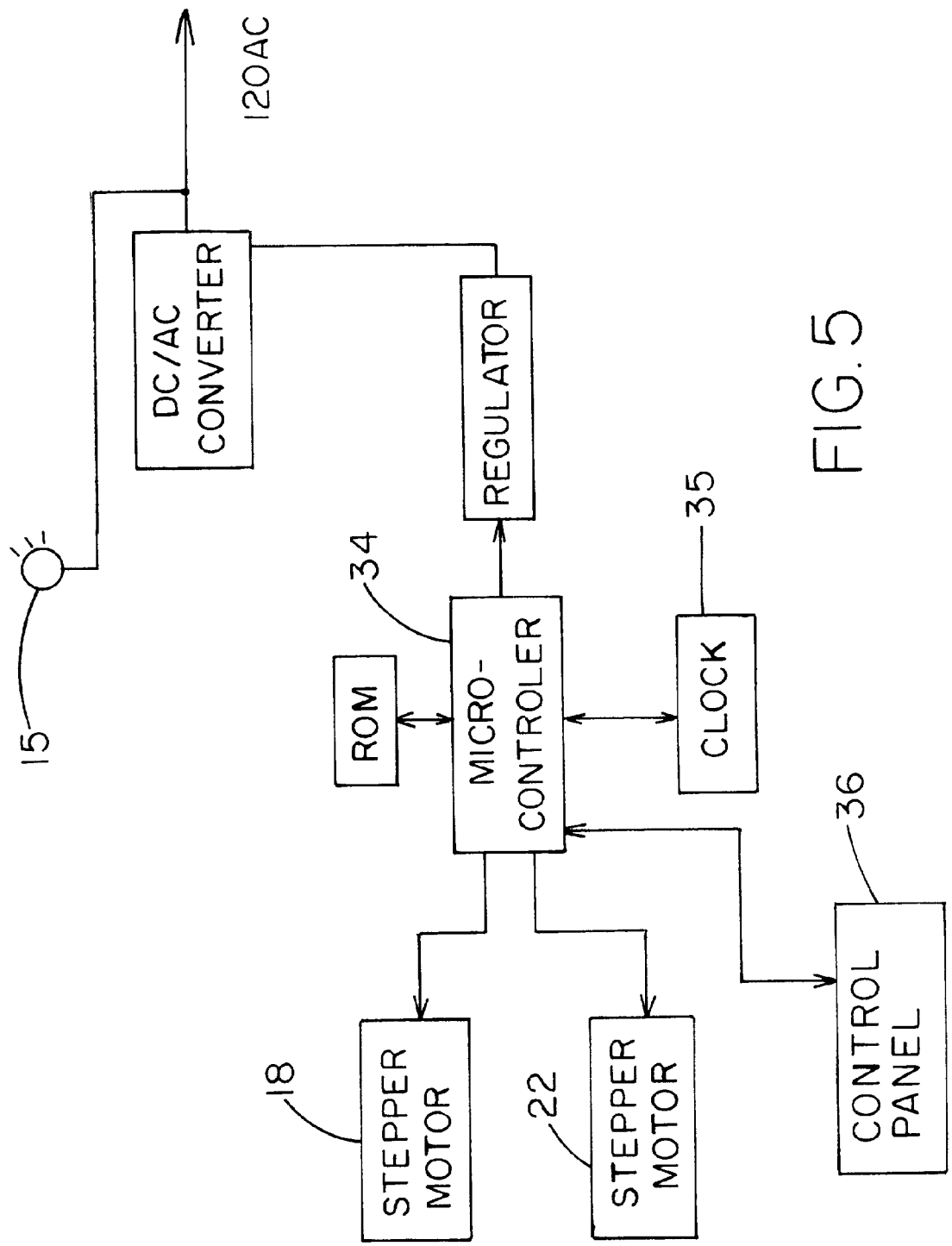
FIG. 5 is a schematic wiring flowchart of the present invention.

FIG. 2 illustrates how electricity is carried to the bulb while it is rotating. The support arm has a pair of metal rings 30 that engage brushes 31 in the lumen of the center shaft. One brush is electrically connected to a power source and the other is connected to a ground. A pair of wires 32 extend from the metal rings to a socket in which the bulb is inserted. A bearing 33 helps keep the support arm aligned.

The first and second motors may be controlled by a microcontroller 34 in communication with the first and second motors for positioning the light means and sphere in a correct position in relation to each other for a particular time of day and date. Attached to the microcontroller would be a clock 35 and a control panel 36 for setting a particular time and date.

The use of microprocessor-controlled stepper motors to drive the two related motions of the Earth's spin on its own axis and its elliptical orbit around the Sun is an original and fundamental aspect of the invention. Compared with the use of a purely mechanical link between the two motions (a gear chain or equivalent), a globe using stepper motors offers three basic advantages:

1. It is likely to be cheaper and simpler to manufacturer, and lighter to distribute and use.
2. When initially switched on, it automatically moves quickly to the correct position for the current time, with no need for manual setting or calibration. The globe's position is determined absolutely from the current time on the digital clock, not relatively from the globe's previous position and movement. If a new globe is shipped with a clock battery already fitted and the time set, then when the purchaser first plugs the globe in it will immediately spin around to the correct position.
3. It correctly represents the earth's elliptical orbit around the sun. A purely mechanical link based on gears approximates the earth's orbit as circular: the gears rotate at a constant speed. Such a system would display the earth's illumination correctly only at the equinoxes and solstices. In between, the representation would be incorrect. Users would notice that at some times of year dusk at their point on the globe failed to coincide with dusk outside the window.

The combination of points (2) and (3) above suggest that during much of the year it would in fact be impractical to set a purely mechanical globe to the correct illumination position to start with. The use of stepper motors is therefore fundamental to the function of the globe.

Preferably, the sphere has a hatch pivotally coupled thereto for accessing the bulb for changing the bulb. A first type of hatch 37 is generally round. A second type of hatch 38 has edges along meridian lines of the indicia of the sphere.

In use, the control panel is used to quickly turn the sphere and the light means to a position corresponding with the current time and position of the sun relative to the earth. The microcontroller controls operation of the first and second motors to rotate them in the manner set forth above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A globe, comprising:
   a base having an arm coupled thereto;
   a sphere having indicia representing the surface of the earth and an axis, said sphere being rotatably coupled to said arm of said base along said axis of said sphere;
   said sphere being translucent;
   a light means positioned in said sphere for emitting light on a portion of said sphere corresponding to a portion of the earth illuminated by sunlight at a given time; and
   said sphere completing one 360 degree revolution in 24 hours for simulating rotation of the earth about its axis; and
   a motor for rotating said light means.

2. The globe of claim 1, wherein said light means is rotatable in said sphere, said light means completing one 360 degree revolution in 365¼ days for simulating orbit of the earth about the sun.

3. The globe of claim 1, wherein said axis of said sphere is angled at about 23.5 degrees from the vertical for representing the tilt of the axis of the earth relative to the orbit path of the earth around the sun.

4. The globe of claim 1, further comprising a first motor for rotating said sphere.

5. The globe of claim 1, wherein said light means comprises a bulb and a generally circular shading plate dimensioned for blocking light emitted by said bulb such that said shading plate shades about one-half of said sphere shaded from light emitted from said bulb.

6. The globe of claim 5, wherein said bulb and shading plate rotate about a center point of said sphere along a horizontal plane.

7. The globe of claim 4, further comprising a microcontroller communicating with said motor rotating said light means and said motor rotating said sphere for positioning said light means and sphere in a correct position in relation to each other for a particular time of day and date.

8. A globe, comprising:
   a base having a arm coupled thereto;
   a sphere having indicia representing the surface of the earth and an axis, said sphere being rotatably coupled to said arm of said base along said axis of said sphere;
   said sphere being translucent;
   a light means rotatably positioned in said sphere for emitting light on a portion of said sphere corresponding to a portion of the earth illuminated by sunlight at a given time;
   said sphere completing one 360 degree revolution in 24 hours for simulating rotation of the earth about its axis;
   said light means completing one 360 degree revolution in 365¼ days for simulating orbit of the earth about the sun;
   said axis of said sphere being angled at about 23.5 degrees from the vertical for representing the tilt of the axis of the earth relative to the orbit path of the earth around the sun;
   a first motor for rotating said sphere;
   a second motor for rotating said light means
   said light means comprising a bulb and a generally circular shading plate dimensioned for blocking light emitted by said bulb such that said shading plate shades about one-half of said sphere shaded from light emitted from said bulb;
   said bulb and shading plate rotating about a center point of said sphere along a horizontal plane;
   a microcontroller in communication with the first and second motors for positioning said light means and sphere in a correct position in relation to each other for a particular time of day and date;
   a clock and a control panel for setting a particular time and date; and
   said sphere having a hatch for accessing said bulb.

9. A globe, comprising:
   a base having an arm coupled thereto;
   a sphere having indicia representing the surface of the earth and an axis, said sphere being rotatably coupled to said arm of said base along said axis of said sphere;
   said sphere being translucent;
   a light means positioned in said sphere for emitting light on a portion of said sphere corresponding to a portion of the earth illuminated by sunlight at a given time; and
   a first motor for rotating said sphere; and
   a second motor for rotating said light means.

10. The globe of claim 9 wherein said sphere completes one 360 degree revolution in 24 hours for simulating rotation of the earth about its axis, and including a microcontroller communicating with said first and second motors for positioning said light means and sphere in a correct position in relation to each other for a particular time of day and date.

\* \* \* \* \*